United States Patent [19]

White et al.

[11] Patent Number: 5,232,465
[45] Date of Patent: Aug. 3, 1993

[54] METHOD FOR ACCELERATING AND SYNCHRONIZING SEED GERMINATION

[75] Inventors: Donald B. White, White Bear Lake; Phil S. Allen, St. Paul, both of Minn.

[73] Assignee: Regents of the University of Minnesota, Minneapolis, Minn.

[21] Appl. No.: 813,350

[22] Filed: Dec. 24, 1991

Related U.S. Application Data

[63] Continuation-in-part of Ser. No. 670,480, Mar. 15, 1991, abandoned, which is a continuation of Ser. No. 400,489, Aug. 30, 1989, abandoned.

[51] Int. Cl.$^5$ .............................................. A01B 97/00
[52] U.S. Cl. ......................................... 47/58; 47/1.01
[58] Field of Search ................................ 47/58 R, 1.01

[56] References Cited

U.S. PATENT DOCUMENTS 3,521,402  7/1970  Chaffee .
4,912,874  4/1990  Taylor .

OTHER PUBLICATIONS

R. Austin et al., "Some Effects of 'Hardening' Carrot Seed", *Annals of Botany*, 33:884–896 (1969).
S. Bakos, "Plugging into Seeders", *Florists' Review*, pp. 22–29 (1983).
M. Bennett et al., "Influence of Seed Moisture on Lima Bean Stand Establishment and Growth", *J. Amer. Soc. Hort. Sci.*, 109:623–626 (1984).
M. Bennett et al., "Seed Hydration Treatments for Improved Sweet Corn Germination and Stand Establishment", *J. Amer. Soc. Hort. Sci.*, 112(1):45–49 (1987).
A. Berrie et al., "The Effect of Hydration-Dehydration on Seed Germination", *New Phytol.*, 70:135–142 (1971).
K. Bradford, "Manipulation of Seed Water Relations Via Osmotic Priming to Improve Germination Under Stress Conditions", *Hort. Science*, 21(5):1105–1112 (Oct. 1986).
H. Chippindale, "The Effect of Soaking in Water on the 'Seeds' of Dactylis glomerata L.", *Annals of Botany*, 47:841–849 (1933).
T. Hegarty, "The Possibility of Increasing Field Establishment of Seed Hardening", *Hort. Res.*, 10:59–64 (1970).
T. Hegarty, "Seed Activation and Seed Germination Under Moisture Stress", *New Phytol.*, 78:349–359 (1977).
T. Hegarty, "The Physiology of Seed Hydration and Dehydration, and the Relation Between Water Stress and the Control of Germination: A Review", *Plant, Cell and Environ.*, 1:101–119 (1978).
W. Heydecker et al., "Seed Treatments for Improved Performance-Survey and Attempted Prognosis", *Seed Sci. and Technol.*, 5:353–425 (1977).
W. Lush et al., "Presowing Hydration-Dehydration Treatments in Relation to Seed Germination and Early Seedling Growth of Wheat and Rye Grass", *Aus. J. Plant. Physiol.*, 8:409 (1981).

*Primary Examiner*—Henry E. Raduazo
*Attorney, Agent, or Firm*—Merchant & Gould

[57] ABSTRACT

The invention provides a method for accelerating and synchronizing seed germination comprising subjecting a population of seeds to a plurality of hydration and dehydration periods. In the hydration period, seeds are contacted with liquid water for a time less than time required for continuously hydrated seeds of the same species to germinate. In the dehydration period which follows the hydration periods seeds are removed from contact with liquid water and dehyrated at about 80% or greater relative humidity. Seeds are cycled through alternating hydration and dehydration periods to yield a final population of seeds which germinates rapidly and in substantial synchronicity upon re-exposure to liquid water. The dehydrated population of seeds may be further dried at relative humidities of less than about 40% so that the final population of seeds may be stored under ambient conditions before re-exposure to liquid water.

9 Claims, 6 Drawing Sheets

METHOD FOR ACCELERATING AND SYNCHRONIZING SEED GERMINATION

This is a continuation-in-part of pending application Ser. No. 07/670,480, filed Mar. 15, 1991 which was a continuation of application Ser. No. 07/400,489, filed on Aug. 30, 1989, now abandoned.

BACKGROUND OF THE INVENTION

For at least the past fifty years, there has been an interest in the possibilities of enhancing seed performance, particularly with respect to improved germination and seedling establishment. Seed treatments that initiate or complete the germination process under controlled conditions prior to sowing would possess a number of practical advantages, particularly if germination could be both synchronized and accelerated. Rapid establishment of a uniform population of seedlings improves the ability of the crop to compete with weeds, and further economies result from the management of a uniform population of plants, including enhanced uniformity of the yield at harvest. Rapid germination following sowing can reduce erosion by rapidly stabilizing denuded slopes and can bring playing fields such as golf greens to playable levels in shorter times, using less seed. Rapid germination can reduce the exposure of the planted seed to infection, thus reducing the need for extensive chemical control of conditions such as damping off. In fact, the time from seeding to harvest for a given crop could be effectively shortened by at least the number of days normally required for germination in the soil.

Attempts to accelerate germination have included the use of physical or chemical treatments intended to shorten the dormancy period following seed formation. Such treatments include exposure of seed to light, exposure of seed to cool moist conditions (stratification), mechanical scarification, treatment with chemical agents such as gibberellic acid, potassium nitrate, thiourea, hydrogen peroxide or ethylene, seed hardening, and osmotic priming.

Controlling seed hydration can influence the timing and synchronization of germination. The known methods for control of hydration limit the amount water available to the seed during hydration. For example, in osmotic priming, seeds are exposed to polyethylene glycol in an aqueous solution which acts to decrease the amount of water available to the seed during hydration. Generally, subsequent drying reduces the degree of advancement or synchronization obtained by osmotic priming.

Seed hardening treatments involve allowing the seeds to take up water followed by drying them back to near the original moisture content. Water uptake is limited by the imbibition time or quantity of water made available to the seed. Seeds are dried b ck to near their original moisture contents by air drying, drying with heat or freeze drying, so that seeds can be stored without deterioration.

There is a varied response to seed hardening. In some cases, drying back eliminates the beneficial effects of pregermination hydration treatments so that germination is delayed and desynchronized like that seen in untreated seeds. In other cases, dehydration can lead to secondary dormancy or even damage to the embryo. Seed hardening, when successful, usually only shortens germination time by days.

Therefore, it is an object of the present invention to decrease the germination time of seeds following planting and at the same time to increase synchronous germination of the seeds.

It is a further object of this invention to obtain seeds that are capable of rapid synchronous germination in a consistent manner following storage under ambient humidities.

SUMMARY OF THE INVENTION

These and other goals are achieved by the present invention which is directed to a method for accelerating and synchronizing seed germination, preferably that of grass seed, by exposure of a population of seeds to a plurality of controlled hydration and dehydration periods to adjust the moisture content of the seed population so that rapid synchronous germination occurs. The hydration period is controlled so that the time of imbibition of water is less than the time required for germination of continuously hydrated seeds. The dehydration period is conducted at humidities of about 80% relative humidity or greater resulting in a controlled rate of drying and a predictable seed moisture content. The moisture content of both the hydrated and dehydrated seed populations is preferably increased in a stepwise fashion over the moisture content of the initial population, until the moisture content of the seed population reaches a critical point at which germination will occur. Upon subsequent exposure to liquid water, the final population of dehydrated seeds will germinate in substantial synchronicity in a shorter time period than untreated seeds. For some types of grass seeds, one or two cycles of hydration/dehydration will be sufficient to achieve synchronization and acceleration of germination, while other species of grass may require about 16–20 cycles.

Surprisingly, the present method can be used to improve the ability of older seeds to germinate and can rejuvenate seeds with low vigor. The seeds produced in accord with the present invention can also retain enhanced synchronization following air drying. The rapid germination of the present seeds also reduces their exposure to damping off organisms, such as Pythium spp., thus reducing or eliminating the need to apply fungicides or other chemical treatments to the seeds.

The present invention can be used to replace one type of ground cover with a second ground cover, particularly in situations in which maintaining an intact layer of cover is important, e.g., to the protection or use of the surface. For example, in the case of golf courses, it often necessary to convert from one variety of grass to another, to adjust the characteristics of the grass to seasonal changes in the weather. Conventionally, this is accomplished by heavy overseeding into the old turf, so that the new variety uniformly replaces the prior variety. However, due to the wide variation in germination times within the population of seed which is applied, much seed is wasted. The present invention yields a population of seed that has been presynchronized with respect to germination, and will germinate in a reduced period of time, thus advantageously shortening the time that the course cannot be used.

The seeds of the present invention are also useful when it is desired to rapidly cover a bare area of ground with grass or other plants, e.g., to protect it against erosion or against the leaching of hazardous residues. The area sought to be protected can be seeded and then exposed to water for a pre-selected period in order to accomplish the germination of seeds and initiate growth of the seedlings.

DETAILED DESCRIPTION OF THE INVENTION

Figure 1:
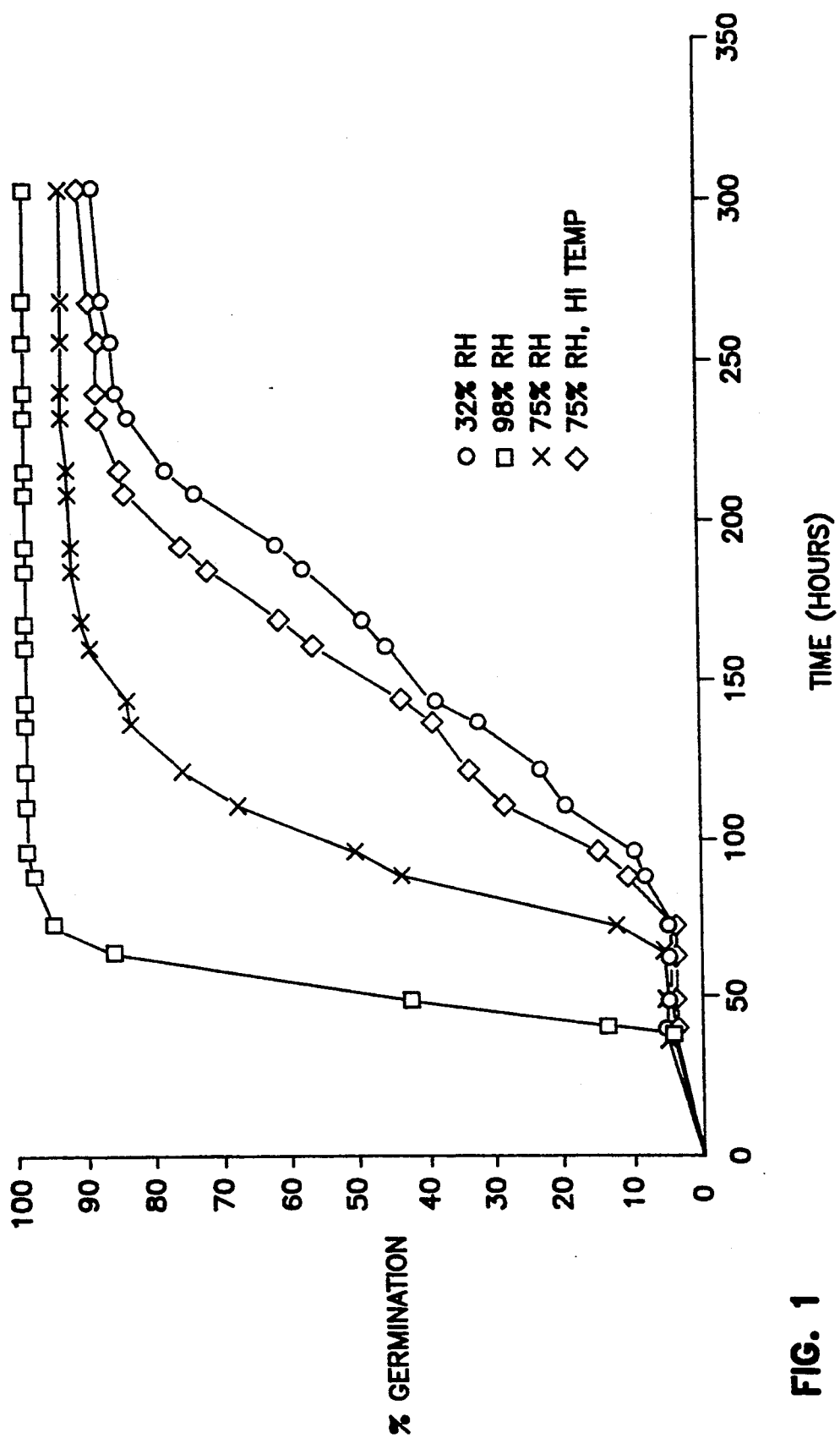
FIG. 1 summarizes the effect of a single hydration/dehydration pretreatment upon germination of *Lolium perenne* (perennial ryegrass) seeds when dehydration was conducted for 72 hours at indicated humidities.

The present invention provides a method to accumulate the germination processes of seeds prior to planting, so that seeds germinate more rapidly and with a higher degree of synchronicity after planting than an untreated population of the same seeds.

Normal germination of untreated seeds is delayed and asynchronous in comparison to seeds treated by the method of the present invention. Germination is "delayed" if the seed population does not germinate for a relatively long period of time following exposure to water, e.g., when germination takes at least about 40 hours or greater. Seeds are "asynchronized" if the time it takes to go from 10% to 90% relative germination is a relatively long period of time from the onset of germination, e.g., at least about 48 hours or greater. Germination is "accelerated" if the seed population begins to germinate within a relatively short period of time after exposure to water, preferably less than about 40 hours, and more preferably less than about 24 hours. Germination is "synchronized" if the time it takes to go from 10% to 90% relative germination is a relatively short period of time from the onset of germination, preferably less than about 48 hours and more preferably less than about 24 hours.

In accord with the present method, the seeds are "cycled" to a critical point just prior to germination by hydrating and dehydrating the seeds under conditions which control the moisture content of the seeds. A hydration and dehydration cycle consists of a hydration period, which yields a hydrated population, and a dehydration period, which yields a dehydrated population. The moisture content of the hydrated population and dehydrated population is preferably increased in a stepwise fashion over the moisture content of the initial seed population, until the moisture content of the cycled seeds reaches a critical point at which germination will occur. Upon subsequent exposure to liquid water, the final population of dehydrated seeds will hydrate and germinate in substantial synchronicity and in a time period that is shorter than the time required to germinate untreated seeds. For example, on exposure to liquid water under ambient conditions, the germination time of perennial ryegrass seeds cycled in accord with the present invention can be reduced to about 16 hours or less with a relative germination of about 90%, e.g. 97.5% to 100% of the viable seeds. For some types of grass seeds two cycles of hydration and dehydration will be sufficient to achieve effective acceleration and synchronization of germination, while other species of grass may require as many as 16-20 cycles.

Hydration of the seeds in the present invention is controlled by the total amount of time the seed is exposed to water. The time of the hydration period will be less than the time required for seeds of the same species to germinate upon continuous hydration. Continuously hydrated seeds are exposed to water until germination begins to occur. The time it takes continuously hydrated seeds of a particular species to germinate is determined empirically and is well known to those of skill in the art. For example, perennial ryegrass seeds germinate between 48 and 90 hours of continuous hydration. In accord with the present method, total hydration or imbibition time can accumulate over several cycles of hydration and dehydration, so long as the total time of hydration is less than the time it takes continuously hydrated seeds to germinate. Also, it is preferred that the moisture content of each population of hydrated seeds be higher than that of the prior hydrated population of seeds and the initial population of untreated seeds. By way of example, seeds hydrated with water within the range of about 5-50 hours, have increased seed water content of preferably about 1.25 to 3 times the seed water content of untreated seeds, more preferably about 1.5 to 2.5 times that of untreated seeds.

The dehydration period follows the hydration period and is conducted at relative humidities of 80% or greater for varying amounts of time. Perennial ryegrass seeds are preferably dehydrated in an atmosphere of greater than about 90% relative humidity, and more preferably at about 93%-98% relative humidities. This can be achieved by floating the seeds on a raft in a closed container of a saturated salt solution. The relative humidity in the air of the chamber containing salt solutions corresponds to a particular water potential. A specific vapor pressure gradient can be achieved above the liquid, preferably at a water potential of about $\Psi = -1$ MPa to $-20$ MPa at ambient temperature and pressure, and more preferably about $\Psi = -1$ MPa to $-10$ MPa, and most preferably $\Psi = -1$ MPa to $-5$ MPa. Ambient temperatures are about 25° C. to 27.5° C. This gradient provides a controlled rate of drying and a predictable seed moisture content at any time following the introduction of the seeds into the vapor (drying) phase environment that is not achieved when seeds are dehydrated by air drying. By way of example, seeds dehydrated at a water potential within the range of about $-1$ MPa to $-20$ MPa, preferably $-1$ MPa to $-5$ MPa for about 10-20 hours have an increased seed water content, preferably about 1.20 to 1.75 times the seed water content, of untreated seeds, more preferably about 1.25 to 1.5 times the water content of untreated seeds. In contrast, seeds dehydrated at lower relative humidities, including air drying, at water potentials of about $-30$ to $-150$ MPa, have seed water contents equivalent to or less than the initial population of untreated seeds.

A single cycle of hydration of seeds followed by dehydration at a relative humidity of 80% or greater can result in rapid and synchronized germination of the seeds even if the seeds are further dehydrated at a relative humidity of less than about 40%, e.g. by air drying. By way of example, perennial ryegrass seeds exposed to a hydration period at 25° C. for 40 hours, followed by a dehydration period at 98% relative humidity ($\Psi = -4$ MPa), and then air dried ($\Psi = -150$ MPa) for 7 days exhibit rapid synchronous germination. Air drying typically involves relative humidities of about 10% to 50%, depending on geographic location and time of year. The initial dehydration at about 80% or greater relative humidity is preferably conducted for at least about 24 hours. Seeds pretreated with a dehydration period at about 80% or greater relative humidity can be stored for at least about 7 days under normal atmospheric humidities and still exhibit rapid and synchronous germination.

Seeds can be exposed to a plurality of controlled hydration and dehydration cycles, so that the moisture content of the seed population is adjusted so that rapid synchronous germination will occur. For some types of grass seeds, two cycles of hydration/dehydration or less will be sufficient to achieve adequate acceleration and synchronization of germination, while other species of grass may require as many as 16-20 cycles or more. Seeds are alternated between hydration and dehydration periods for preselected time periods, typically about 8-24 hours. The moisture content of the initial seed population is preferably increased at a controlled rate by controlling the time of hydration, and then by conducting the dehydration period at relative humidities of greater than about 80%. Upon subsequent exposure to liquid water, the final population of seeds will germinate rapidly and in substantial synchronicity. Typically about 90% of the viable seeds germinate in about 24 hours or less upon reexposure to water.

By way of example, grass seeds treated with a hydration period of 40 hours had a seed moisture content about 2 times that of untreated seeds. The seeds were then dehydrated for 24 hours at relative humidity of greater than 80% for 24 hours and the seed moisture content was about 1.4 times that of untreated seeds. The dehydrated population of seeds was further treated by air drying for 24 hours and then re-exposed to water and seeds germinated to 80% relative germination within 40 hours upon reexposure to water. In grass seeds repeatedly cycled with hydration/dehydration period of 8 hours, 85% of the seeds germinated in less than 20 hours upon re-exposure to water.

In accord with the present invention, seed synchronization has been achieved with four genotypes of *Lolium perenne* (perennial ryegrass) and with *Poa anna* (annual bluegrass, several genotypes). Although the invention is described primarily with respect to grass seeds, it is expected to be generally applicable to the seeds of monocots such as the grains, e.g., corn, wheat, barley, oats, rice, sorghum, and rye. Also, the seeds of plants such as orchard grass, freesia, cashew nuts, and fescue, and processed plants such as soybeans, beets, carrots, celery, tomatoes, onions, lupins, sunflower and cotton can be improved by the present method. The invention should be particularly effective in species where there is a substantial time interval between maturation and germination of the seeds under natural conditions.

EXAMPLE

FIG. 1 summarizes the effect of a single hydration/dehydration cycle on germination of *Lolium perenne* (ryegrass seeds) when the dehydration, step was conducted for 72 hours at various humidities. The initial hydration was carried out for 40 hours at 25° C by placing the seeds on moist filter paper in a sealed petri dish. Following 40 hours of hydration, the seeds were dehydrated for 72 hours at 32% relative humidity (R.H.) ($\Psi = -150$ MPa, 75% R.H. ($\Psi = -39$ MPa), 75% R.H. and high temperature ($\Psi = -36$ MPa, 35° C.), and 98% R.H. ($\Psi = -4$ MPa). The seeds were then re-exposed to water at 25° C., and time and percentage of germination was measured. Time on the X axis includes the total amount of time seeds were in contact with water including the initial 40 hour hydration time.

The results show that dehydration at 98% relative humidity resulted in greater than 95% of the seeds germinating within 12 hours of re-exposure to water with germination beginning immediately. In contrast, when dehydration was conducted at 32% R.H., only a maximum of 80% of the seeds germinate after 180 hours of re-exposure to water. At 75% relative humidity, 90% germination was obtained after 110 hours of re-exposure to water. Dehydration at humidities of 75% or less resulted in at least a 10-fold increase in time to 90% germination indicating germination was asynchronous. Also, germination did not begin until 10-50 hours after re-exposure to water. A single cycle of hydration followed by dehydration at 98% relative humidity resulted in rapid synchronous germination of 95% of the seeds in less than 12 hours.

EXAMPLE 2

Figure 2:
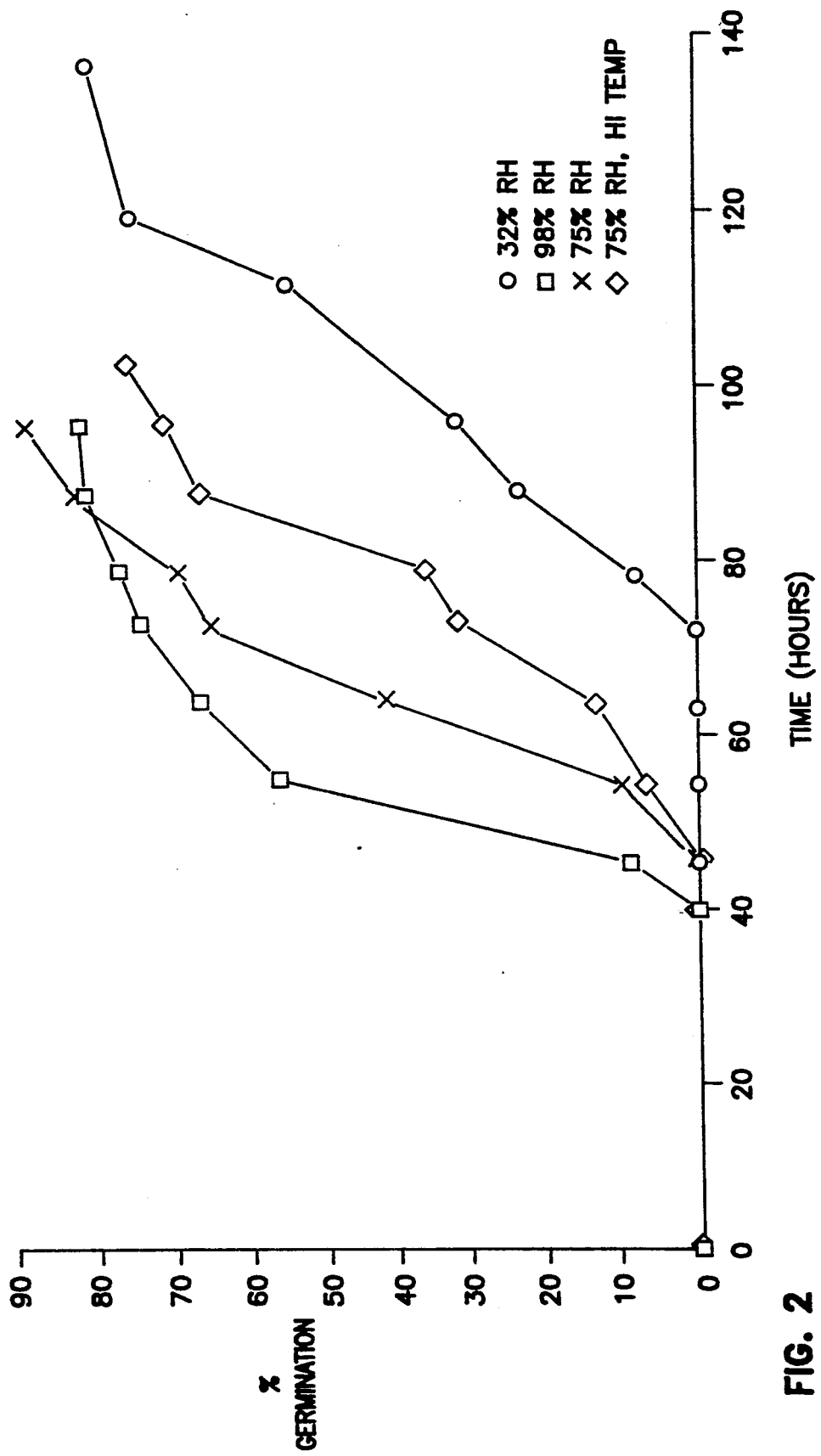
FIG. 2 summarizes the effect of a single hydration/dehydration pretreatment upon germination of *Lolium perenne* when dehydration was conducted for 4 hours at indicated humidities.

FIG. 2 summarizes the effect of a single hydration/dehydration cycle on germination of *Lolium perenne* seeds when dehydration was conducted for 4 hours at various humidities. Seeds were hydrated for 40 hours at 25° C. by placing the seeds on moist filter paper in a sealed petri dish. Seeds were then dehydrated for 4 hours at 98% R.H. ($\Psi = -4$ MPa), 75% R.H. ($\Psi = -36$ MPa), 75% relative humidity and high temperature ($\Psi = -39$ MPa, 35° C.), and 32% R.H. ($\Psi = -150$ MPa). Seeds were then re-exposed to water at 25° C. and time and percentage germination was measured. The X axis reflects the total amount of time seeds were in contact with water including the initial 40 hour hydration time.

The results show that when dehydration was conducted at 98% R.H., 50% of the dehydrated seeds germinated in less than 10 hours following re-exposure to water. In contrast, with dehydration at 32% R.H., 50% of the seeds were not germinated until >60 hours of reexposure to water. With dehydration at 75% R.H., 50% of the seeds germinated after 20 hours of re-exposure to water. Dehydration at humidities of 75% or less resulted in at least a 2 to 7-fold increase in time to germination of 50% of the seeds, and germination was asynchronous. However, using dehydration at 98% R.H., 50% of the seeds were synchronized following a single cycle of hydration/dehydration in less than 10 hours.

EXAMPLE 3

Figure 3:
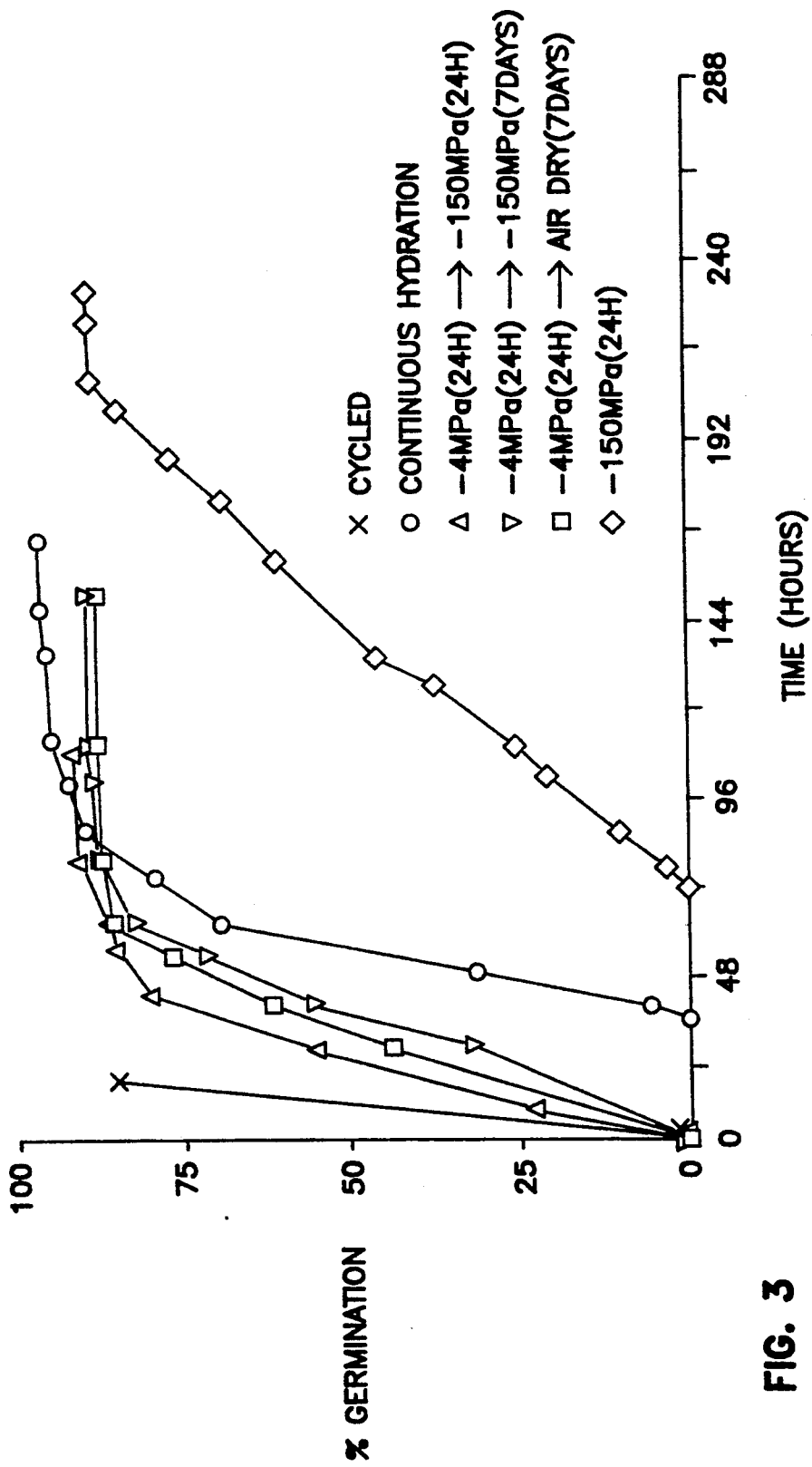
FIG. 3 compares continuous hydration with various hydration/dehydration pretreatments.

FIG. 3 summarizes the results of treatment of perennial ryegrass seeds with a dehydration period at 98% R.H. ($-4$ MPa) followed by drying at lower humidities of 32% R.H. ($-150$ MPa) or air drying for various times. Seeds were first hydrated for 40 hours at 25° C. on a moist filter paper in a sealed petri dish. Some samples were then dehydrated at 98% R.H. for 24 hours, followed by dehydration at 32% R.H. or air drying for 1 to 7 days. Seeds were also dehydrated at 32% R.H. for 24 hours. Cycled seeds were hydrated for 16 hours, dehydrated for 8 hours at 93% R.H. ($\Psi = -10$ MPa), followed by hydration for 16 hours, followed by dehydration for 8 hours at 93% R.H. The control seeds were continuously hydrated until germination. After dehydration, seeds were re-exposed to water at 25° C. and percentage germination and time to germination were measured.

The results show that seeds dehydrated at 32% R.H. for 24 hours exhibit delayed and desynchronized germination. Germination of seeds does not start until about 72 hours after re-exposure to water and germination of 85% of the seeds was not reached until about 200 hours. Treatment of seeds by dehydrating at 98% R.H. before drying at lower humidities of 32% R.H. or air drying prevents this delayed and desynchronized germination. The high relative humidity during dehydration results in rapid synchronous germination un rehydration; seeds dehydrated at 98% R.H. exhibit rapid synchronous germination. Germination began immediately upon re-exposure to water and 85% of seeds germinated in about 40 hours.

Seeds were dehydrated at 98% R.H. for 24 hours, and then air dried or dried at 32% R.H. for 7 days. Seeds were then rehydrated until germination occurred. If the seeds were first dehydrated at 98% R.H., dehydration at 32% R.H. or air drying for 7 days had no effect on timing or percent of germination. After the initial dehydration at 98% R.H., seeds can be stored for 7 days at ambient humidities and still exhibit rapid synchronous germination.

Cycled seeds exhibit rapid synchronous germination as well. Upon re-exposure to water, cycled seeds began to germinate immediately and 80% of the seeds germinated in less than 20 hours.

EXAMPLE 4

Fifty seeds of "DelRay" perennial ryegrass (Northrup King) were subjected to hydration/dehydration cycles at 26.5° C. Following 16 hours of hydration on water-saturated blotting paper, the seeds were transferred to a sealed jar where they were floated on a raft on a saturated aqueous potassium nitrate solution (R.H. = 93%, $\Psi = -10$ MPa) for 8 hours at 26.5° C. Repeating this procedure twice fulfilled the critical fluctuation period (2.0 cycles) and 100% of the viable seeds germinated upon re-exposure to water at 26.5° C.

EXAMPLE 5

Figure 4:
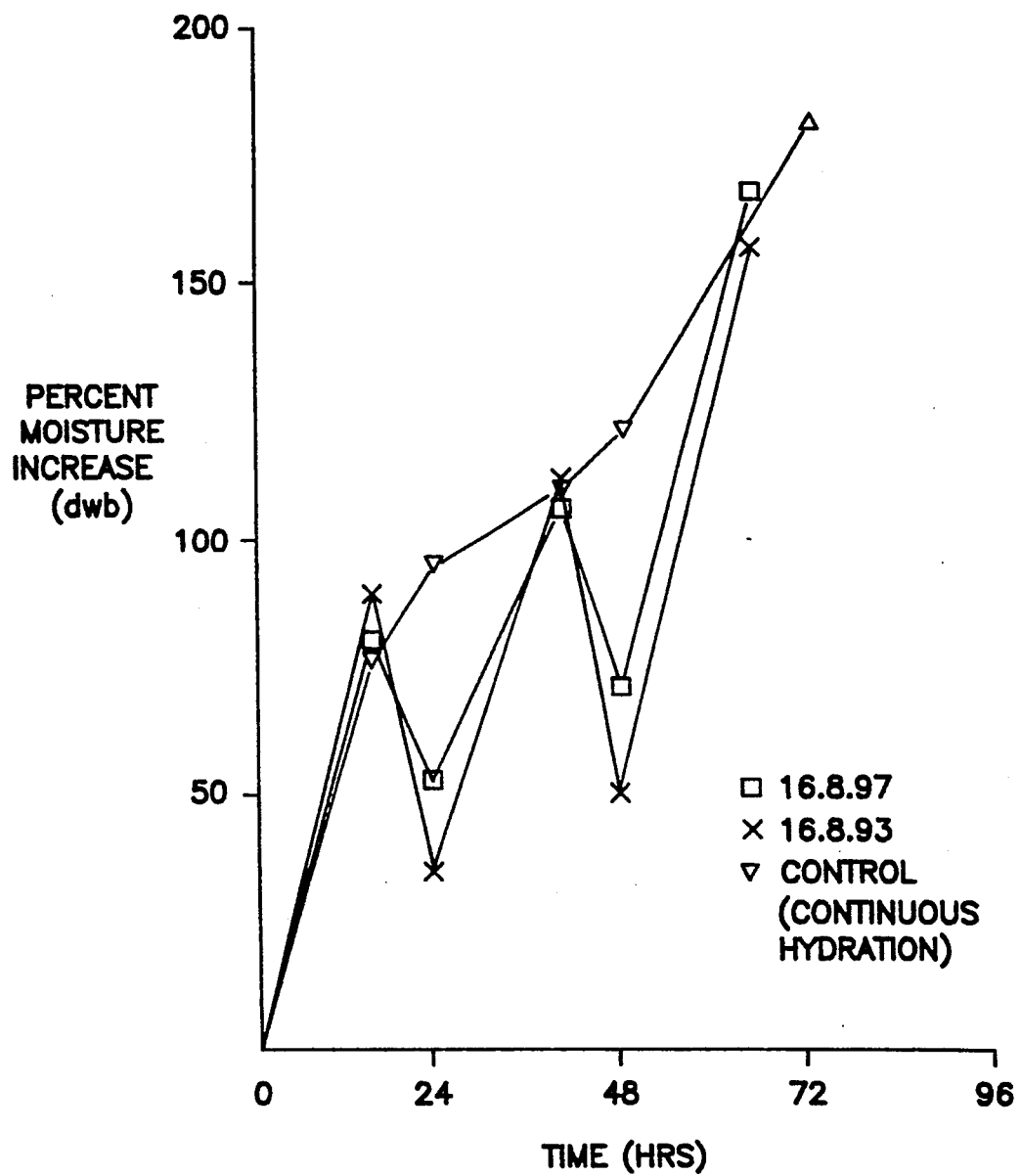
FIG. 4 summarizes the results of repeated hydration/dehydration periods on moisture content of *Lolium perenne* seeds as compared to continuously hydrated seeds.

FIG. 4 summarizes the results of repeated hydration/dehydration periods on moisture content of *Lolium perenne* (ryegrass) seeds. The hydration (liquid) periods were carried out for 16 hours at 26.5° C. The dehydration (vapor) cycles were carried out for 8 hours at $\Psi = -4$ or $-10$ MPa (at 97% and 93% R.H.) at 26° C., respectively. The control seeds were continuously hydrated with liquid water at 26° C. and germinated between 40 and 72 hours. Recent moisture increase was measured as a change in seed weight in comparison to dry weight basis (dwb). The arrows on the plots indicate the point at which the first seed germinated. All of the cycled seeds dehydrated at 93% (16.8.93 plot) germinated during the hydration step between 48 and 64 hours. The moisture content of the seeds after first hydration period was about 2 times that of untreated seeds (100% increase). After dehydration at either 93% R.H. or 97% R.H., the moisture content was 1.3 to 1.5 times, or increased about 30-50%, of that of untreated seeds. After hydration of dehydrated seeds, the moisture content of the once dehydrated seeds was increased about 110% that of untreated seeds. After dehydration of the twice hydrated seeds, moisture content was about 1.5 to 1.75, or increased about 50-75%, over that of untreated seeds. After hydration of twice dehydrated seeds, seed moisture content was about 2.5-3 times, or about 150-200%, that of untreated seeds. Treatment of seeds with a plurality of hydration and dehydration periods results in a stepwise or incremental increase in seed moisture content of each subsequent population over that of untreated seeds.

EXAMPLE 6

*Lolium perenne* seeds were hydrated for 8 hours. The seeds were then dehydrated at (a) 98% R.H. ($\Psi = -4$ MPa), (b) at 75% R.H. ($\Psi = -36$ MPa, 26° C.), (c) 75% R.H. and high temperature ($\Psi = -39$ MPa, 35° C.), and (d) 32% R.H. ($\Psi = -150$ MPa), for various times. Seed moisture contents were measured by weighing a sample of seeds at various times during hydration and comparing the change in the seed weight to the weight of the same number of untreated seeds maintained under ambient conditions. The seed water content was measured as percent change in seed weight by dividing the increase in seed weight by the weight of untreated seed.

Figure 5:
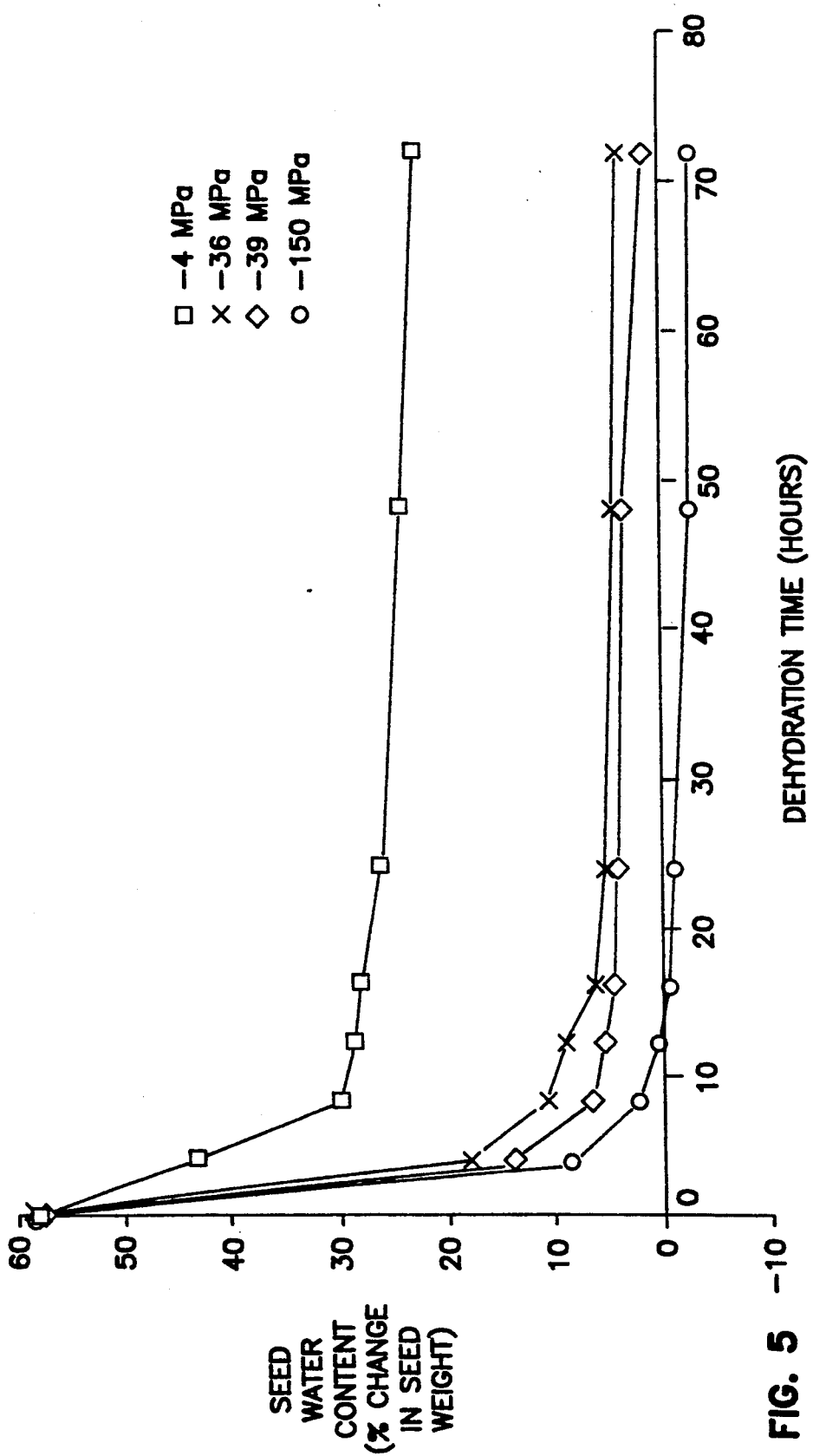
FIG. 5 summarizes the results of dehydration at various humidities on seed moisture content after an initial hydration period of 8 hours.

The results of dehydration at various relative humidities on seed moisture content are summarized in FIG. 5. After an initial hydration period of 8 hours, seeds had about 1.5 to 1.6 times the seed water content (50-60% increase) over that of untreated control seeds. After dehydration, only the seeds dehydrated at 98% R.H. had a seed water content that was increased over that of the untreated seeds of about 30%. Seeds dehydrated at relative humidities of 75% or less, $\Psi = -36$ to $-150$ MPa, had seed moisture contents equivalent to or less than that of untreated seeds. Dehydration at high relative humidities results in a change in seed moisture content at a controlled rate which is important for rapid synchronous germination.

EXAMPLE 7

*Lolium perenne* seeds were hydrated for 40 hours as described in Example 1. Seeds were then dehydrated at 98% R.H. ($\Psi = -4$ MPa), at 75% R.H. ($\Psi = -36$ MPa, 26° C.), 75% R.H. and high temperature ($\Psi = -39$ MPa, 35° C.), and 32% R.H. ($\Psi = -150$ MPa) for various times. Seed moisture contents were determined by weighing a sample of seeds at various times during hydration and comparing the seed weight to the weight of a similar number of untreated seeds held under ambient conditions. The seed water content was measured as percent change in seed weight by dividing the increase in seed weight by the weight of untreated seed.

Figure 6:
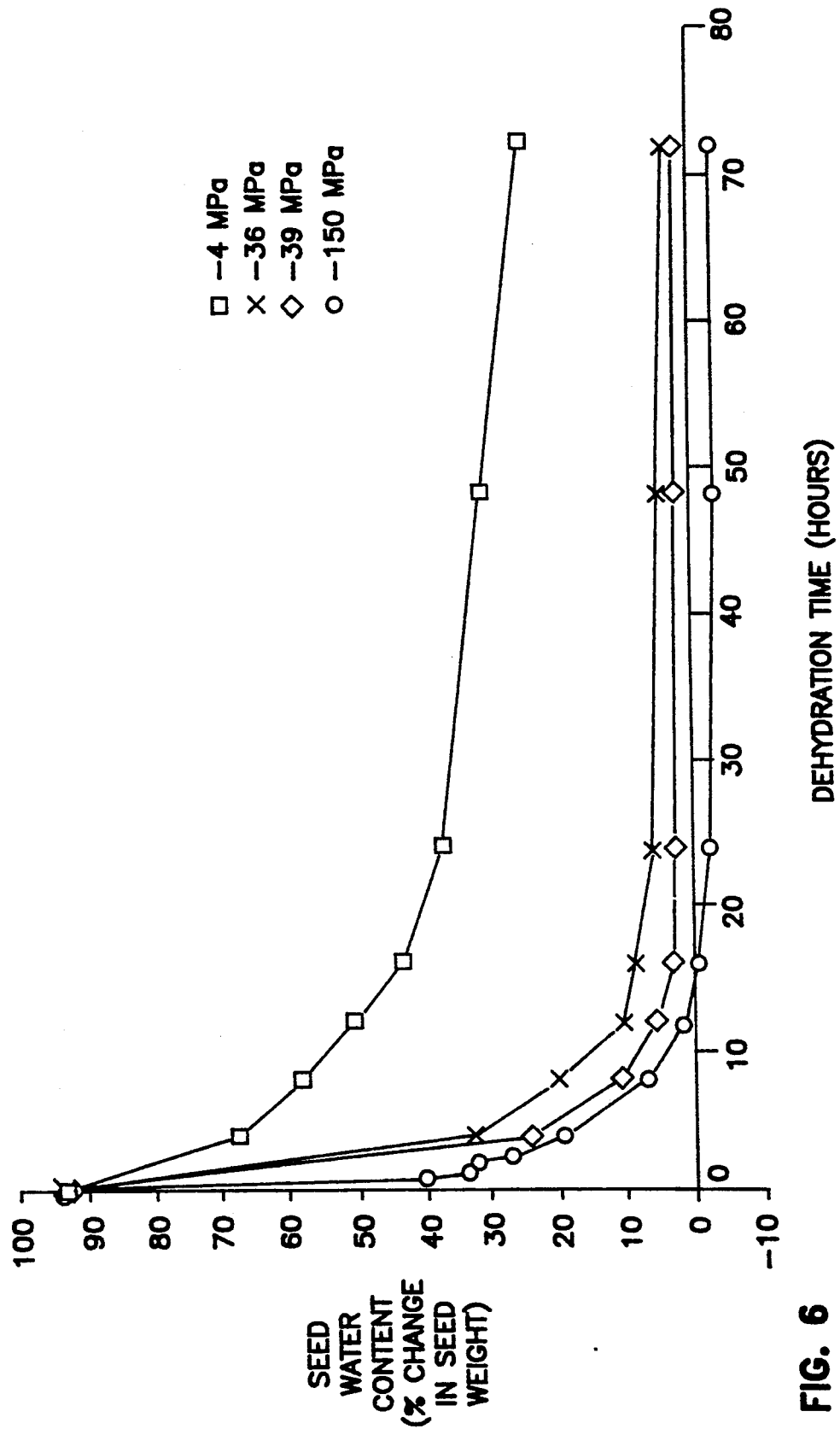
FIG. 6 summarizes the results of dehydration at various humidities on seed moisture content after an initial hydration period of 40 hours.

The results of dehydration at various relative humidities on seed moisture content are summarized in FIG. 6. After initial hydration period of 40 hours, the seeds had about 2 times the seed water content over that of untreated seeds (or 90-100% increase). After dehydration, only the seeds dehydrated at 98% R.H. had a seed water content that was increased over that of untreated seeds (by about 30-40%). Seeds dehydrated at relative humidities of 75% or less, $\Psi = -36$ to $-150$ MPa, had seed moisture contents equivalent to or less than that of untreated seeds. Dehydration at high relative humidities results in a lowering in seed moisture content at a controlled rate which is important for rapid synchronous germination.

EXAMPLE 8

Repeated hydration/dehydration cycles on *Poa annual* (bluegrass) seeds were also carried out. The hydration cycles (liquid) were carried out at 26° C. The dehydration (vapor) cycles were carried out at −10 MPa (93% R.H.). The control seeds were continuously hydrated with liquid water.

Table I, below, summarizes the percent germination observed for *Poa annua* seeds which were cycled in accord with the present method for up to 16 hydration:-dehydration (liquid:vapor) periods.

TABLE I

TREATMENT CYCLES RESTRICTING GERMINATION OF *Poa annua* SEEDS
(cycle = liquid:−10 MPa)

| LIQUID:VAPOR CYCLE (hours) | GERMINATION (%)* | |
|---|---|---|
| | DURING CYCLING | FOLLOWING CYCLING |
| 8:16[a] | 0* | 81 |
| 8:24[b] | 0* | 72 |

*Indicated significant difference from control, which had 75% germination between 56-136 hours of hydration.
[a]Thirteen hydration/dehydration cycles, followed by <32 hours of hydration.
[b]Ten hydration/dehydration cycles, followed by <32 hours of hydration.

The data on Table 1 demonstrates that the present method is effective to both delay germination before planting and to synchronize germination upon continuous hydration following cycling.

The invention has been described with reference to very specific and preferred embodiments and techniques. However, it should be understood that many variations and modifications may be made while remaining within the spirit and scope of the invention.

What is claimed is:

1. A method for accelerating and synchronizing germination of grass seed comprising, prior to sowing said seed:
    subjecting a population of grass seeds to a plurality of alternating hydration and dehydration periods to yield a final population of grass seeds which germinate rapidly and in substantial synchronicity upon re-exposure to liquid water, wherein in each hydration period the population of grass seeds is contacted with liquid water for a time less than the time required for continuously hydrated grass seeds of the same species to germinate, and wherein in each dehydration period, the population of grass seeds is removed from contact with liquid water and dehydrated by exposure to an atmosphere of about 80% or greater relative humidity.

2. The method of claim 1, wherein the periods are carried out at temperatures of about 25° C. to 27.5° C.

3. The method of claim 1, wherein the dehydration is carried out at a water potential range of about −1 MPa to −10 MPa.

4. The method of claim 1 comprising subjecting the final population of grass seeds to further dehydration at a relative humidity of about 40% or less so that seeds may be stored before re-exposure to liquid water.

5. A method for accelerating and synchronizing germination of grass seed comprising, prior to sowing said seed:
    (a) contacting an initial population of grass seeds with liquid water for a time less than the time required to germinate said initial population, to yield a once-hydrated population of grass seeds;
    (b) removing the once-hydrated population of grass seeds from contact with liquid water and dehydrating said population at about 80% or greater relative humidity for at least about 24 hours to yield a once-dehydrated population of grass seeds; and
    (c) further dehydrating the once-dehydrated grass seeds at a humidity of about 40% relative humidity or less to yield a final population of grass seeds which germinate rapidly and substantially synchronously upon re-exposure to water.

6. The method of claim 5, wherein carried out at temperatures of about 25° C. to 27.5° C.

7. The method of claim 5, wherein the dehydration of step (b) is carried out at a water potential range of about −1 to −10 MPa.

8. The method of claim 5, wherein the dehydration of step (c) is carried out by air drying.

9. The method of claim 5, wherein the dehydration of step (c) is carried out for at least 7 days.

* * * * *

UNITED STATES PATENT AND TRADEMARK OFFICE
CERTIFICATE OF CORRECTION

PATENT NO. : 5,232,465

DATED : August 3, 1993

INVENTOR(S) : Donald B. White, et al

It is certified that error appears in the above-indentified patent and that said Letters Patent is hereby corrected as shown below:

Column 10, line 35, insert --steps (a)-(c) are -- after "wherein".

Signed and Sealed this

Twenty-fourth Day of May, 1994

Attest:

BRUCE LEHMAN

*Attesting Officer*   *Commissioner of Patents and Trademarks*